United States Patent
Chen et al.

(10) Patent No.: US 12,066,522 B2
(45) Date of Patent: Aug. 20, 2024

(54) NAVIGATION DEVICE APPLIED TO A WIRELESS IDENTIFICATION TAG

(71) Applicant: PixArt Imaging Inc., Hsin-Chu (TW)

(72) Inventors: Shih-Feng Chen, Hsin-Chu (TW); Han-Lin Chiang, Hsin-Chu (TW); Ning Shyu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 310 days.

(21) Appl. No.: 17/574,588

(22) Filed: Jan. 13, 2022

(65) Prior Publication Data

US 2023/0221427 A1 Jul. 13, 2023

(51) Int. Cl.
*G01S 13/75* (2006.01)
*G06K 19/07* (2006.01)
*G08B 21/18* (2006.01)

(52) U.S. Cl.
CPC ........ *G01S 13/751* (2013.01); *G06K 19/0723* (2013.01); *G08B 21/182* (2013.01)

(58) Field of Classification Search
CPC ..... G01S 13/75; G01S 13/751; G06K 19/723; G08B 21/182
USPC ................. 701/300; 342/451, 463
See application file for complete search history.

(56) References Cited

U.S. PATENT DOCUMENTS

| | | | |
|---|---|---|---|
| 6,900,762 B2 * | 5/2005 | Andrews | G01S 5/0036 342/464 |
| 7,751,971 B2 * | 7/2010 | Chang | H04L 67/52 701/457 |
| 7,907,053 B2 * | 3/2011 | Wildman | G01S 5/0284 340/572.1 |
| 11,309,084 B1 * | 4/2022 | Urrutia | H04L 67/12 |
| 11,363,419 B2 * | 6/2022 | Ayers | G01S 5/0226 |
| 11,409,308 B2 * | 8/2022 | Kwak | G05D 1/0276 |
| 11,449,061 B2 * | 9/2022 | Ebrahimi Afrouzi | A47L 9/28 |
| 11,654,570 B2 * | 5/2023 | Jang | B25J 9/1694 700/253 |
| 11,657,531 B1 * | 5/2023 | Ebrahimi Afrouzi | A47L 11/4025 382/284 |
| 11,669,994 B1 * | 6/2023 | Ebrahimi Afrouzi | G06T 7/593 348/239 |
| 11,763,651 B2 * | 9/2023 | Shakedd | G06Q 20/3224 340/572.3 |
| 11,830,619 B2 * | 11/2023 | Pipher | G16H 15/00 |
| 2004/0068368 A1 * | 4/2004 | Adams, Jr. | G08G 1/005 340/995.18 |
| 2020/0321241 A1 * | 10/2020 | Na | H01L 29/0649 |
| 2023/0152471 A1 * | 5/2023 | Nekoui | H04W 12/108 342/357.64 |

\* cited by examiner

*Primary Examiner* — Andrew Joseph Rudy
(74) *Attorney, Agent, or Firm* — Winston Hsu

(57) ABSTRACT

A navigation device applied to a wireless identification tag includes a movable signal transceiver and an operation processor. The movable signal transceiver is adapted to transmit a detection signal and receive an actuation signal relevant to the detection signal. The operation processor is electrically connected to the movable signal transceiver. The operation processor is adapted to analyze the actuation signal to acquire relative position between the movable signal transceiver and the wireless identification tag, and generate a motion parameter in accordance with the relative position for moving the movable signal transceiver.

12 Claims, 6 Drawing Sheets

NAVIGATION DEVICE APPLIED TO A WIRELESS IDENTIFICATION TAG

BACKGROUND OF THE INVENTION

1. Field of the Invention

The present invention relates to a navigation device, and more particularly, to a navigation device applied to a wireless identification tag.

2. Description of the Prior Art

The cleaning robot automatically detects an obstacle in cleaning process via the image detection technology or the optical detection technology. Detection accuracy of the image detection technology is easily affected by environmental light variation, deformation or shade variation of an object. Detection accuracy of the optical detection technology is easily affected by a reflective index or a refractive index of the object material. Besides, a detector disposed on top of the cleaning robot is difficult to detect the low-height obstacle, such as a carpet; the cleaning robot may be expected to detour somewhere no obstacle is positioned. Conventional solution can utilize an infrared emitter to draw a side line, which means a plurality of infrared emitters can be arranged on the carpet or the floor in a queue, and the cleaning robot detects infrared signals of the plurality of infrared emitters to regard as a virtual wall. However, the infrared emitter has a battery for power supply, and the virtual wall may be unstable when the battery volume of the infrared emitter is weak. Thus, conventional assembly of the cleaning robot and the infrared emitter has drawbacks of inconvenience and high cost due to frequent replacement of the battery.

SUMMARY OF THE INVENTION

The present invention provides navigation device applied to a wireless identification tag for solving above drawbacks.

According to the claimed invention, a navigation device applied to a wireless identification tag includes a movable signal transceiver and an operation processor. The movable signal transceiver is adapted to transmit a detection signal and receive an actuation signal relevant to the detection signal. The operation processor is electrically connected to the movable signal transceiver. The operation processor is adapted to analyze the actuation signal to acquire relative position between the movable signal transceiver and the wireless identification tag, and generate a motion parameter in accordance with the relative position for moving the movable signal transceiver.

According to the claimed invention, the operation processor is further adapted to determine position information of the wireless identification tag in accordance with the relative position, and determine whether to output a warning message or to activate or shut down a specific function of the navigation device in accordance with the position information.

According to the claimed invention, the operation processor is further adapted to determine whether the movable signal transceiver is stayed inside or move away from a specific region in accordance with the relative position, and to activate or shut down a specific function of the navigation device accordingly.

According to the claimed invention, the navigation device has a regional map, and the operation processor is further adapted to calibrate coordinate information of the movable signal transceiver within the regional map in accordance with the relative position.

According to the claimed invention, the navigation device has a regional map, and the operation processor is further adapted to determine whether the wireless identification tag is stayed in an allowable region within the regional map in accordance with the relative position.

According to the claimed invention, the navigation device has a regional map, and the operation processor is further adapted to establish a moving trace of the wireless identification tag within the regional map in accordance with the relative position.

According to the claimed invention, the navigation device has a regional map, and the operation processor is further adapted to determine coordinate information of the wireless identification tag within the regional map in accordance with the relative position, and to output a control command for driving an external device in accordance with the coordinate information.

According to the claimed invention, a number of the wireless identification tag is plural, and the operation processor is further adapted to analyze position variation between a plurality of wireless identification tags in accordance with relative position between the movable signal transceiver and the plurality of wireless identification tags, and to determine whether to output a warning message in accordance with the position variation.

According to the claimed invention, a number of the wireless identification tag is plural, and the operation processor is further adapted to set a virtual boundary in accordance with relative position between the movable signal transceiver and a plurality of wireless identification tags, and to move the movable signal transceiver stayed inside or across the virtual boundary. The operation processor is further adapted to activate or shut down a specific function of the navigation device in response to the movable signal transceiver moved across the virtual boundary.

According to the claimed invention, a number of the wireless identification tag is plural, and the operation processor is further adapted to set a virtual area in accordance with relative position between the movable signal transceiver and a plurality of wireless identification tags, and to control the movable signal transceiver moved within the virtual area.

According to the claimed invention, the operation processor is further adapted to analyze annotation information of the wireless identification tag, and to activate or shut down a specific function of the navigation device in accordance with the annotation information.

The navigation device of the present invention can have the movable signal transceiver matched with the wireless identification tag. The navigation device can be the cleaning robot or similar electronic apparatus. The movable signal transceiver can be moved relative to the floor when the cleaning robot sweeps and mops the floor. The navigation device can utilize the received signal strength indication technology (RSSI) or the angle of arrival technology (AOA) or similar technology to compute variation of a distance and an angle of the navigation device relative to the wireless identification tag, so as to accordingly actuate and shut down the related function of the navigation device. The movable signal transceiver of the navigation device can be matched with the wireless identification tag to establish the virtual boundary or the virtual area, or record the moving trace and the final position of the specific object, or apply for the home security. The wireless identification tag has no battery and can be used for a long time without battery charge or replacement, and can further provide the annotation information to assign tasks.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
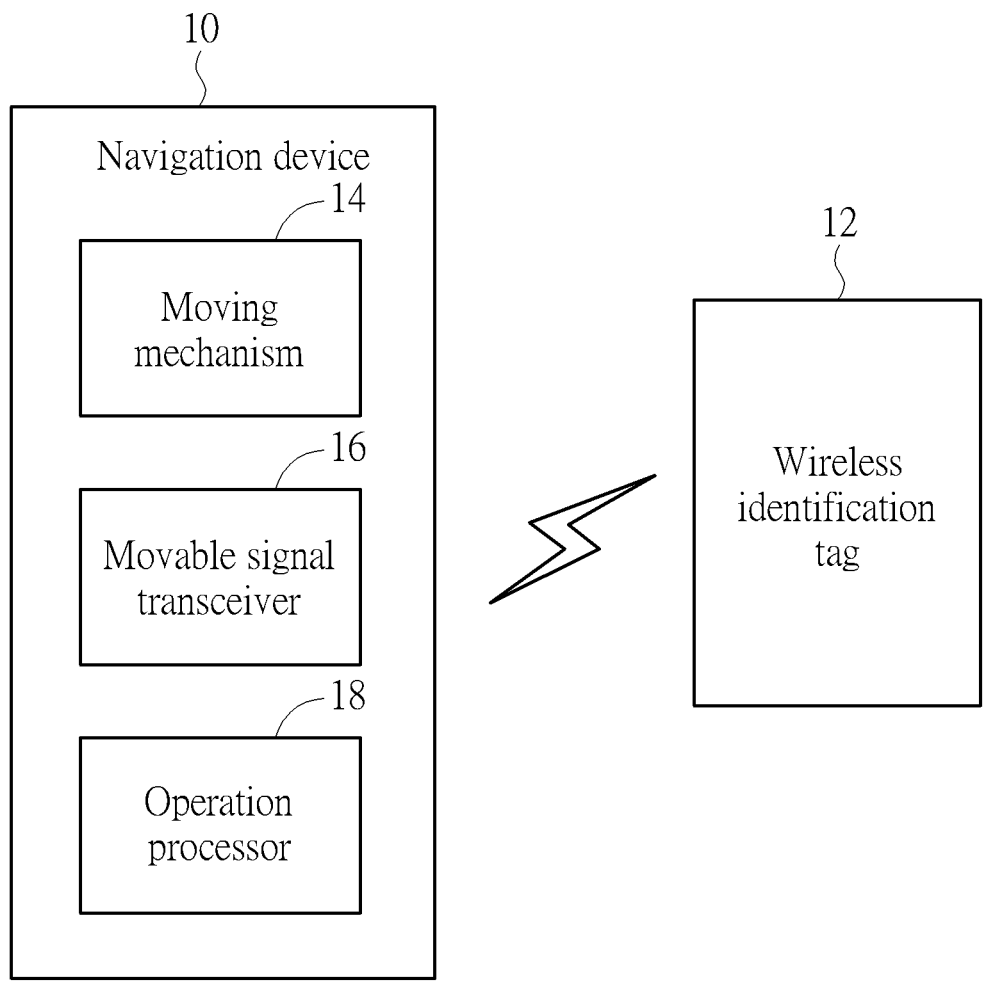
FIG. 1 is a functional block diagram of a navigation device according to an embodiment of the present invention.

Please refer to FIG. 1. FIG. 1 is a functional block diagram of a navigation device 10 according to an embodiment of the present invention. The navigation device 10 can be matched with one or some wireless identification tags 12, and analyze position of the wireless identification tag 12 to provide a variety of applications. For example, the navigation device 10 may be a cleaning robot or any electronic apparatus with a moving function. The wireless identification tag 12 can be the radio frequency identification, the multi-radio tag, the battery assisted passive tag, or any wireless communication components with a target identification function. The identification tag 12 can be disposed on a movable object, such as an organism or a moving machine, and used to identify a moving trace or a position of the movable object. The wireless identification tag 12 can be further disposed on an immobile place, and the navigation device 10 can read data annotated on the wireless identification tag 12 to determine place where on the wireless identification tag 12 is located when the navigation device 10 is moved close to or across the wireless identification tag 12.

The navigation device 10 can include a moving mechanism 14, a movable signal transceiver 16 and an operation processor 18. The moving mechanism 14 can be a roller mechanism, a caterpillar mechanism or any equivalent mechanism for moving a main body of the navigation device 10. The movable signal transceiver 16 can be moved relative to a supporting plane with motion of the moving mechanism 14. The supporting plane may be the floor if the navigation device 10 is the cleaning robot, which depends on an actual demand. The movable signal transceiver 16 can emit a detection signal continuously or intermittently. The wireless identification tag 12 can generate an actuation signal by a trigger of the detection signal, and the movable signal transceiver 16 can receive the actuation signal relevant to the detection signal from the wireless identification tag 12. The operation processor 18 can be electrically connected to the movable signal transceiver 16. The operation processor 18 can analyze the actuation signal to acquire relative position between the movable signal transceiver 16 and the wireless identification tag 12, and generate a motion parameter in accordance with the relative position for driving the moving mechanism 14 to move the whole navigation device 10.

Figure 2:
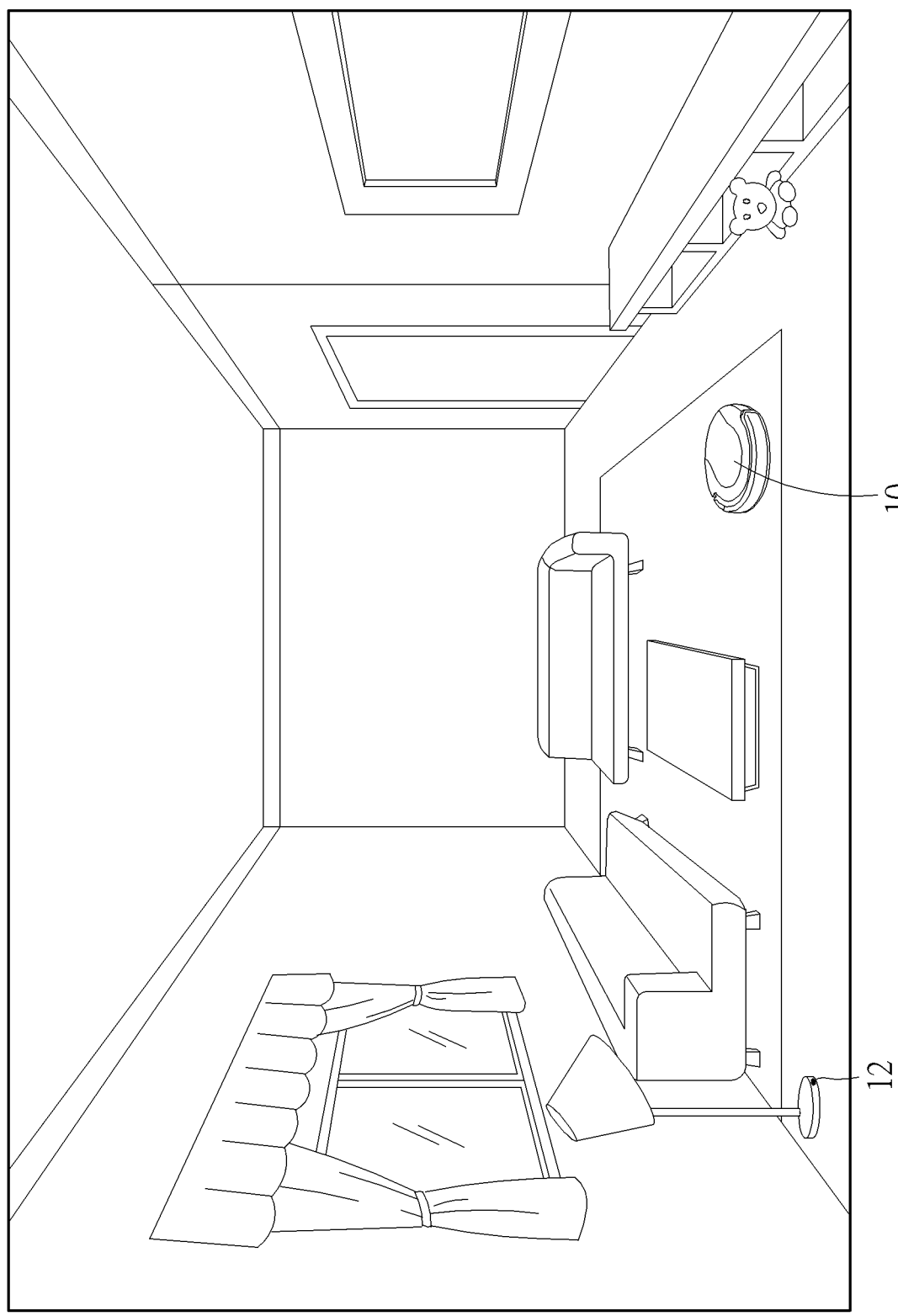
FIG. 2 is an application diagram of the navigation device and the wireless identification tag according to a first embodiment of the present invention.

Please refer to FIG. 2. FIG. 2 is an application diagram of the navigation device 10 and the wireless identification tag 12 according to a first embodiment of the present invention. In the first embodiment, the navigation device 10 can be matched with one wireless identification tag 12, and the wireless identification tag 12 can be disposed on a place in want of annotation information. As shown in FIG. 2, the wireless identification tag 12 can be disposed on a floor lamp, and has the annotation information "no collision" for the floor lamp. When the navigation device 10 is moved close to the floor lamp and the related wireless identification tag 12, the navigation device 10 can slow down a speed of the navigation device 10, or stop motion of the navigation device 10, or change a moving direction of the navigation device 10 to avoid the navigation device 10 from hitting the floor lamp in response to the relative position between the movable signal transceiver 16 and the wireless identification tag 12 smaller than a predefined threshold.

In the first embodiment, the navigation device 10 cam set a specific region centered on the wireless identification tag 12, such as a circular form. A boundary of the specific region can be the predefined threshold mentioned above. When the navigation device 10 is moved close to, or moved across, or just touches the boundary of the specific region, the specific function of the navigation device 10 can be actuated or shut down automatically; for example, the navigation device 10 can slow down the speed of the navigation device 10, or stop the motion of the navigation device 10, or change the moving direction of the navigation device 10.

Furthermore, if a curtain is installed on the door or the window, the wireless identification tag 12 can be disposed on the curtain and have the annotation information "able to pass". When the navigation device 10 is moved close to the wireless identification tag 12 on the curtain and reads the foresaid annotation information, the moving mechanism 14 can be driven to keep the current speed of the navigation device 10 to go through the curtain for cleaning the inside and the outside of the curtain. Moreover, the wireless identification tag 12 may be disposed on the ashcan and have the annotation information "double clean"; when the navigation device 10 is moved closed to the ashcan and the related wireless identification tag 12, the navigation device 10 can read the foresaid annotation information and increase a suction fore of the cleaning robot or clean an environment around the ashcan twice or more.

Figure 3:
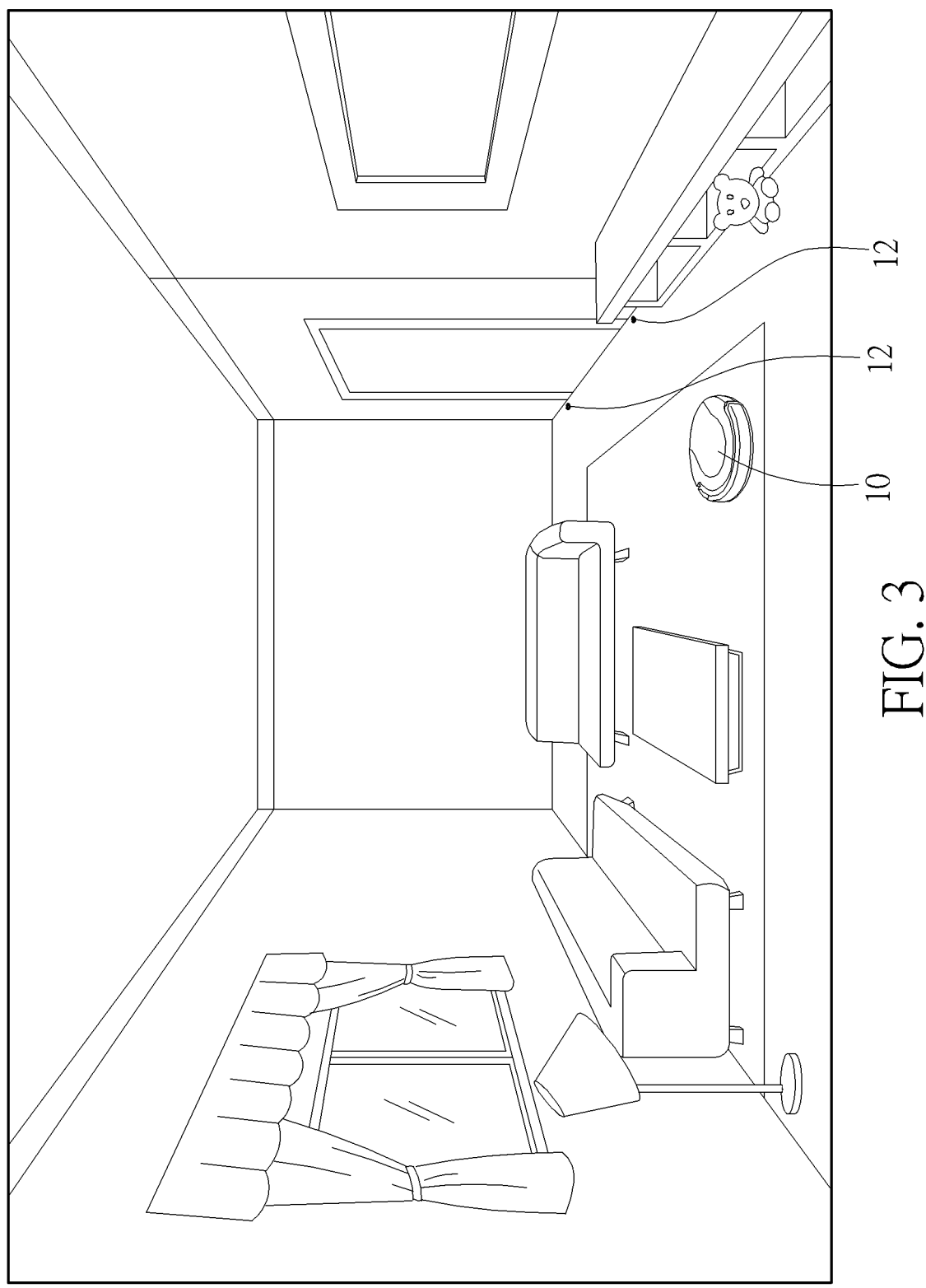
FIG. 3 is an application diagram of the navigation device and the wireless identification tag according to a second embodiment of the present invention.

Please refer to FIG. 3. FIG. 3 is an application diagram of the navigation device 10 and the wireless identification tag 12 according to a second embodiment of the present invention. In the second embodiment, the navigation device 10 can be matched with two wireless identification tags 12, and the wireless identification tags 12 can be respectively disposed on two positions to form a virtual boundary, such as two sides of the door. The virtual boundary is a connection line between the two wireless identification tags 12. When the navigation device 10 is moved closed to the wireless identification tags 12, the navigation device 10 can determine whether to approach the virtual boundary in accordance with the relative position between the movable signal transceiver 12 and the wireless identification tags 12, and then drive the navigation device 10 to move across the virtual boundary, or change the moving direction of the navigation device 10 or stop motion of the navigation device 10 before touching the virtual boundary via the annotation information of the wireless identification tags 12.

The wireless identification tags 12 may have the annotation information "do not pass" or "able to pass", and further have the annotation information for actuating or shutting down the specific function of the navigation device 10. For example, the wireless identification tags 12 may provide the annotation information "able to pass and shut down a cleaning function", and the navigation device 10 can immediately shut down a vacuum cleaner when moving across the virtual boundary, which means the navigation device 10 sweeps the inside room and goes back a charging stand when leaving the room. Further, the wireless identification tags 12 may provide the annotation information "able to pass and actuate the cleaning function", and the navigation device 10 can release water from a tank when moving across the virtual boundary, so that the navigation device 10 can sweep and mop the floor simultaneously when leaving the room. Content of the annotation information labeled in the wireless identification tag 12 and the specific function of the navigation device 10 are not limited to the above-mentioned embodiments, which depend on the actual demand.

Figure 4:
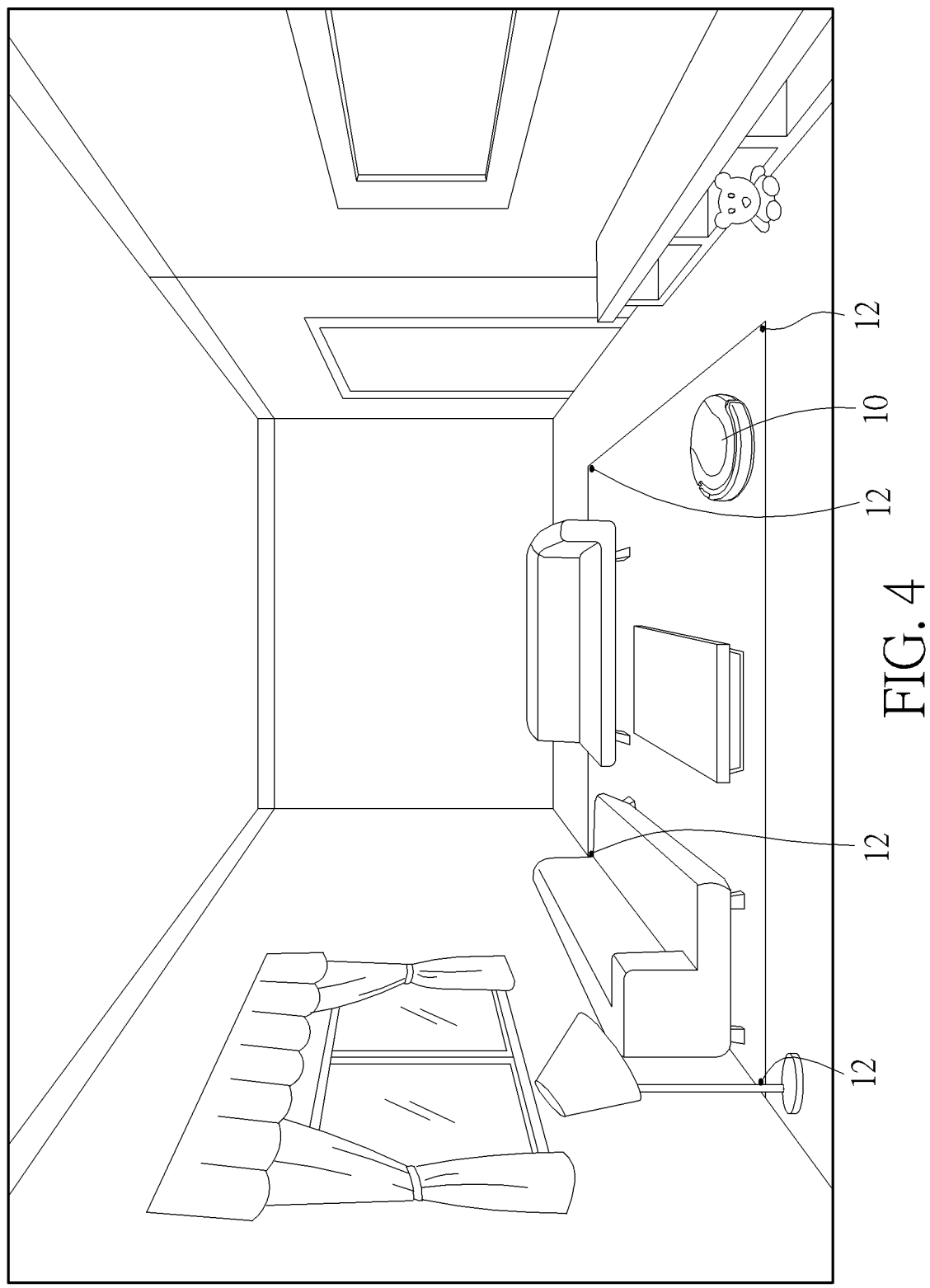
FIG. 4 is an application diagram of the navigation device and the wireless identification tag according to a third embodiment of the present invention.

Please refer to FIG. 4. FIG. 4 is an application diagram of the navigation device 10 and the wireless identification tag 12 according to a third embodiment of the present invention. In the third embodiment, the navigation device 10 can be matched with three or more wireless identification tags 12 used to set a virtual area. As shown in FIG. 4, the wireless identification tags 12 can be respectively disposed on four corners of a carpet. The virtual area is drawn by connection lines between the wireless identification tags 12. When the navigation device 10 is moved closed to the wireless identification tags 12, the navigation device 10 can determine whether to move into or depart from the virtual area in accordance with the relative position between the movable signal transceiver 16 and the wireless identification tags 12, so as to forbid the navigation device 10 entering the virtual area or restrain the navigation device 10 inside the virtual area. The wireless identification tag 12 can also provide the annotation information, and the navigation device 10 can accordingly actuate or shut down the specific function when entering or leaving the virtual area.

Figure 5:
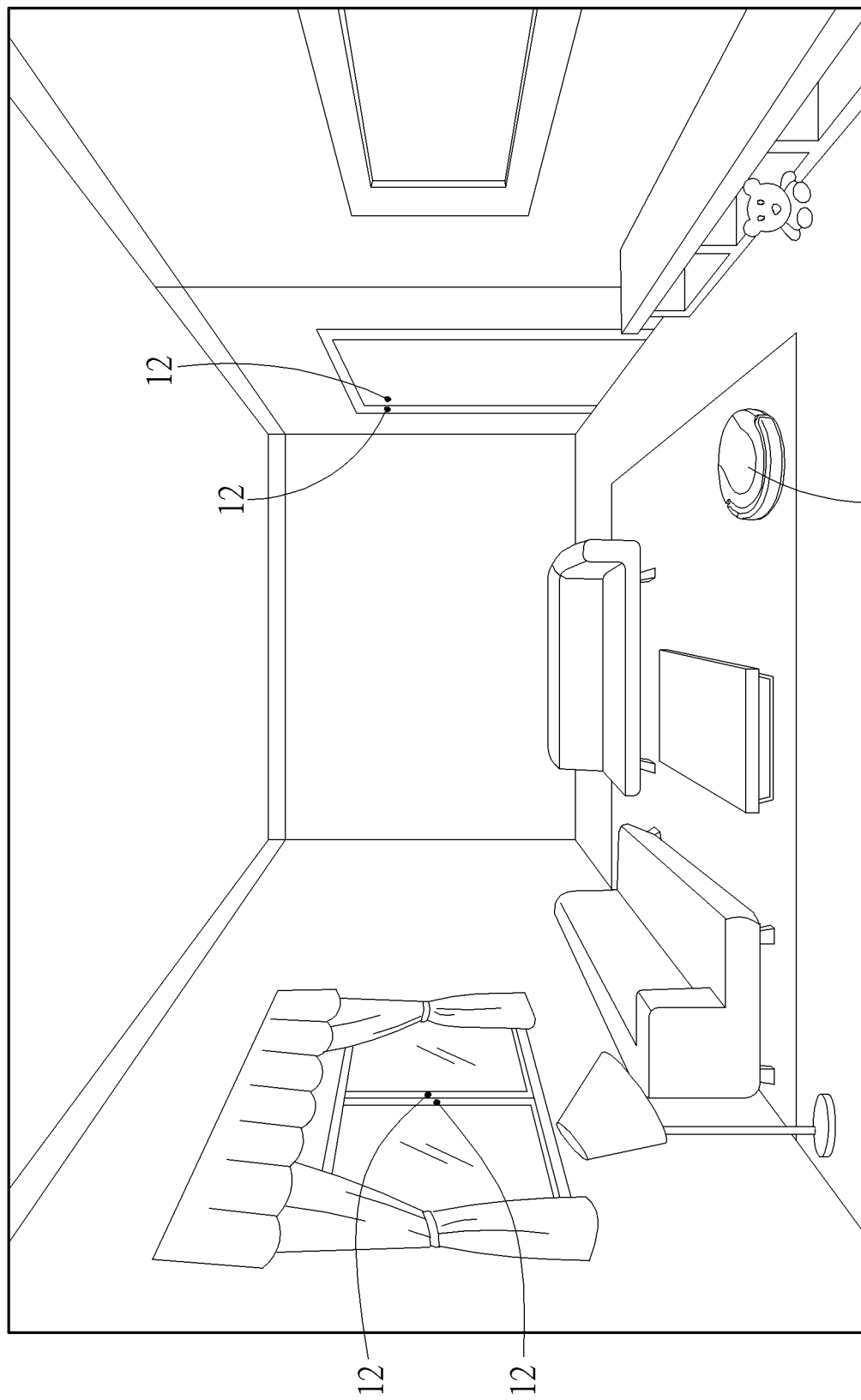
FIG. 5 is an application diagram of the navigation device and the wireless identification tag according to a fourth embodiment of the present invention.

Please refer to FIG. 5. FIG. 5 is an application diagram of the navigation device 10 and the wireless identification tag 12 according to a fourth embodiment of the present invention. In the fourth embodiment, the plurality of wireless identification tags 12 can be respectively disposed on the door and the wall, or respectively disposed on two adjacent windows. The wireless identification tags 12 respectively disposed on the door and the wall can be defined as one set, and the wireless identification tags 12 respectively disposed on the windows can be defined as another set. The navigation device 10 can analyze the relative position between the movable signal transceiver 16 and the wireless identification tags 12, to decide position variation of each set of the matched wireless identification tags 12. The door or the window is opened in response to the position variation of the related set of the wireless identification tags 12 being gradually separated; the door or the window is closed in response to the position variation of the related set of the wireless identification tags 12 being gradually approached. Therefore, the wireless identification tags 12 can be used in home security, and the navigation device 10 can detect the wireless identification tags 12 to decide whether the door and the windows are opened or closed unexpectedly, so as to optionally output a warning message to a contact person or a security center.

Figure 6:
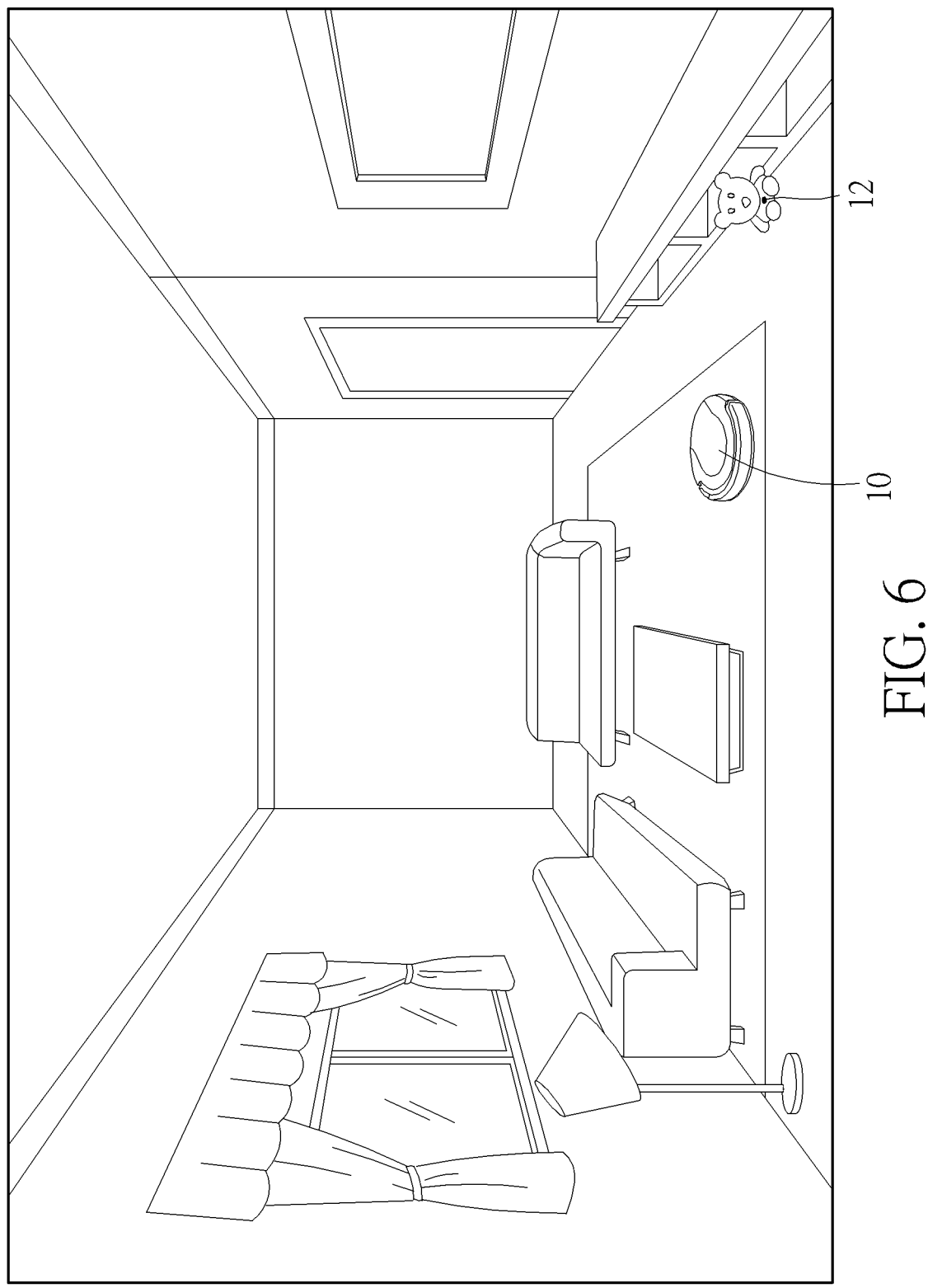
FIG. 6 is an application diagram of the navigation device and the wireless identification tag according to a fifth embodiment of the present invention.

Please refer to FIG. 6. FIG. 6 is an application diagram of the navigation device 10 and the wireless identification tag 12 according to a fifth embodiment of the present invention. The wireless identification tag 12 can be worn on the organism. If the wireless identification tag 12 is worn on the patient, the navigation device 10 can determine the position information of the patient who wears the wireless identification tag 12 in accordance with the relative position between the movable signal transceiver 16 and the wireless identification tag 12 in cleaning process, and further decide whether to output the warning message in accordance with the position information. For example, if the navigation device 10 detects that the patient stays on the seat for a long while via the wireless identification tag 12, the patient may take a rest in a normal status and the navigation device 10 does not output the warning message. If the navigation device 10 detects that the patient stays in a bath room over a normal period, the patient may be in a coma and therefore the navigation device 10 can output the warning message to the contact person or the hospital.

Moreover, the navigation device 10 can analyze the own historical trajectory to set a regional map for a range of activity, and position of the bathroom in the range of activity can be marked in the regional map. If the patient is detected as staying in the bathroom via the wireless identification tag 12, the navigation device 10 can go to clean other place (such as a living room) and then come back to the bathroom after a predefined period for rechecking whether the patient stays in the bathroom; if the patient stays in the bathroom over the predefined period, the navigation device 10 can decide the patient is in danger and output the warning message to the contact person and the hospital.

If the wireless identification tag 12 is disposed on a specific object, the navigation device 10 can determine the position information of the specific object in accordance with the relative position between the movable signal transceiver 16 and the wireless identification tag 12. The specific object may be a smartphone, a key, a remote controller or any important things. A user may forget where the specific object is lost, or the specific object may be hidden by a pet. The specific object may be fallen under the table, the chair or any unexpected place. Besides, the specific object can further be the pet which likes to hide under the cabinet. Therefore, the navigation device 10 can actuate the specific function to record a movement and a final position of the wireless identification tag 12, so that the user can find out the specific object conveniently and rapidly.

If the wireless identification tag 12 is worn on the patient or the pet, the navigation device 10 can set the specific region centered on the wireless identification tag 12. The navigation device 10 can determine whether to approach or depart from the specific region in accordance with the relative position between the movable signal transceiver 16 and the wireless identification tag 12, so as to actuate or shut down the specific function of the navigation device 10. If the navigation device 10 is already to approach the specific region, the navigation device 10 may almost hit the patient or the pet, so that the sweeping function of the navigation device 10 can be shut down, or the moving mechanism 14 can detour the navigation device 10 around the specific region, for preventing the patient or the pet from being scared by the navigation device 10.

The navigation device 10 can not only define the regional map via the own historical trajectory, but also record coordinate information of the wireless identification tag 12 installed on a fixed place within the regional map; the wireless identification tag 12 may be installed on the floor lamp, the curtain, the ashcan, the sides of the door, or the corners of the carpet. When the navigation device 10 is moved by referring to the pre-stored regional map, the relative position between the movable signal transceiver 16 and the wireless identification tags 12 can be used to calibrate the coordinate information of the navigation device 10 within the regional map. For example, the wireless identification tags 12 disposed on the floor lamp, the curtain, the ashcan, the sides of the door and the corners of the carpet can respectively have unique series numbers; when the navigation device 10 is moved to the floor lamp by referring to the regional map, the navigation device 10 can analyze the relative position between the movable signal transceiver 16 and the wireless identification tag 12 on the floor lamp to determine whether the navigation device 10 is correctly located adjacent to the floor lamp or is still distant from the floor lamp, so as to accordingly calibrate the coordinate information of the navigation device 10 within the regional map.

If the plural wireless identification tags 12 having series numbers are disposed on a boundary of an allowable region, such as two sides of the kitchen door, and the wireless identification tag 12 having another series number is disposed on the pet, the navigation device 10 can analyze the relative position between the movable signal transceiver 16 and the plural wireless identification tags 12 (which are disposed on the boundary of the allowable region) and the relative position between the movable signal transceiver 16 and the wireless identification tag 12 (which is disposed on the pet), to determine whether the pet enters, departs from or stays in the allowable region of the regional map, and further to actuate or shut down the specific function of the navigation device 10 accordingly. The navigation device 10 can detect whether the pet enters the allowable region in the cleaning process; if the pet enters the kitchen, the navigation device 10 can output an acoustic message to drive the pet. The acoustic message can be pre-recorded, or made by the user in a remote controlling manner If the wireless identification tag 12 having one series number is disposed on the floor lamp, and the wireless identification tag 12 having another series number is worn on the patient, the navigation device 10 can analyze the relative position between the movable signal transceiver 16 and the wireless identification tag 12 (which is disposed on the floor lamp) and the relative position between the movable signal transceiver 16 and the wireless identification tag 12 (which is worn on the patient), to determine the coordinate information of the patient within the regional map is close to, or departs from, or stays adjacent to the floor lamp. The navigation device 10 may send a control command to switch on the floor lamp in response to the patient close to or staying by the floor lamp, and may further sent another control command to switch off the floor lamp in response to the patient distant from the floor lamp; it is to say, the navigation device 10 and other external devices (such as smart appliances) can be connected to a center host, and the navigation device 10 can automatically actuate or shut down the smart appliances via the center host when the patient is close to or departs from the smart appliances. The smart appliances can be the air conditioner or the television, which depend on the actual demand.

In addition, the navigation device 10 can not only draw the own moving trace within the regional map, but also record the moving trace of the organism who wears the wireless identification tag 12 within the regional map in accordance with the position variation of the movable signal transceiver 16 relative to the wireless identification tag 12. The wireless identification tag 12 may be worn on the patient or the pet as mentioned above, and the navigation device 10 can record and store the moving trace of the patient or the pet in the room. The patient can watch the own moving trace via any portable electronic device that is connected to the navigation device 10 in a wire manner or in a wireless manner; other authorized user can watch the moving trace of the patient or the pet via the navigation device 10 in the remote controlling manner, for observing a staying period of the patient in the bathroom or an activity of the pet.

In conclusion, the navigation device of the present invention can have the movable signal transceiver matched with the wireless identification tag. The navigation device can be the cleaning robot or similar electronic apparatus. The movable signal transceiver can be moved relative to the floor when the cleaning robot sweeps and mops the floor. The navigation device can utilize the received signal strength indication technology (RSSI) or the angle of arrival technology (AOA) or similar technology to compute variation of a distance and an angle of the navigation device relative to the wireless identification tag, so as to accordingly actuate and shut down the related function of the navigation device. The movable signal transceiver of the navigation device can be matched with the wireless identification tag to establish the virtual boundary or the virtual area, or record the moving trace and the final position of the specific object, or apply for the home security. The wireless identification tag has no battery and can be used for a long time without battery charge or replacement, and can further provide the annotation information to assign tasks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A navigation device applied to wireless identification tags, comprising:
   a movable signal transceiver adapted to transmit a detection signal and receive an actuation signal generated by the detection signal from the wireless identification tags; and
   an operation processor electrically connected to the movable signal transceiver, the operation processor being adapted to analyze the actuation signal to acquire relative position between the wireless identification tags, and set an accessible area and a prohibited area in response to the relative position so as to generate a motion parameter for moving the movable signal transceiver within the accessible area instead of the prohibited area.

2. The navigation device of claim 1, wherein the operation processor is further adapted to determine position information of each of the wireless identification tags in accordance with the relative position, and determine whether to output a warning message or to activate or shut down a specific function of the navigation device in accordance with the position information.

3. The navigation device of claim 1, wherein the operation processor is further adapted to determine whether the movable signal transceiver is stayed inside or move away from the accessible area and/or the prohibited area in accordance with the relative position, and to activate or shut down a specific function of the navigation device accordingly.

4. The navigation device of claim 1, wherein the navigation device has a regional map, and the operation processor is further adapted to calibrate coordinate information of the movable signal transceiver within the regional map in accordance with distance variation between the movable signal transceiver and the wireless identification tags.

5. The navigation device of claim 1, wherein the navigation device has a regional map, and the operation processor is further adapted to utilize a connection line between the wireless identification tags to divide the regional map into the accessible area and the prohibited area.

6. The navigation device of claim 1, wherein the navigation device has a regional map, and the operation processor is further adapted to establish moving traces of the wireless identification tags within the regional map in accordance with variation of the relative position.

7. The navigation device of claim 1, wherein the navigation device has a regional map, and the operation processor is further adapted to determine coordinate information of the wireless identification tags within the regional map in accordance with variation of the relative position, and to output a control command for driving an external device in accordance with the coordinate information.

8. The navigation device of claim 1, wherein the operation processor is further adapted to analyze position variation between a plurality of wireless identification tags in accordance with distance variation between the movable signal transceiver and the wireless identification tags, and to determine whether to output a warning message in accordance with the position variation.

9. The navigation device of claim 1, wherein the operation processor is further adapted to set a virtual boundary in accordance with the relative position of the wireless identification tags, and to utilize the virtual boundary to divide the regional map into the accessible area and the prohibited area.

10. The navigation device of claim 9, wherein the operation processor is further adapted to activate or shut down a specific function of the navigation device in response to the movable signal transceiver moved across the virtual boundary.

11. The navigation device of claim 1, wherein the operation processor is further adapted to set a virtual area in accordance with the relative position of the wireless identification tags, and to utilize the virtual area to divide the regional map into the accessible area and the prohibited area.

12. The navigation device of claim 1, wherein the operation processor is further adapted to analyze annotation information of the wireless identification tag, and to activate or shut down a specific function of the navigation device in accordance with the annotation information.

* * * * *